(12) United States Patent
Tsai et al.

(10) Patent No.: US 10,658,137 B1
(45) Date of Patent: May 19, 2020

(54) KEY STRUCTURE

(71) Applicant: Primax Electronics Ltd., Taipei (TW)

(72) Inventors: Sheng-An Tsai, Taipei (TW); Li-Jen Chien, Taipei (TW); Hsiang-Wen Cheng, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 16/362,362

(22) Filed: Mar. 22, 2019

(30) Foreign Application Priority Data

Dec. 28, 2018 (CN) .......................... 2018 1 1622191

(51) Int. Cl.
   *H01H 13/88* (2006.01)
   *H01H 13/705* (2006.01)
   *H01H 3/12* (2006.01)
   *G06F 3/02* (2006.01)

(52) U.S. Cl.
   CPC ........... *H01H 13/88* (2013.01); *G06F 3/0202* (2013.01); *H01H 3/12* (2013.01); *H01H 13/705* (2013.01)

(58) Field of Classification Search
   CPC ......... H01H 13/88; H01H 3/12; G06F 3/0202
   USPC ........................................................ 200/345
   See application file for complete search history.

(56) References Cited

U.S. PATENT DOCUMENTS

| | | | | |
|---|---|---|---|---|
| 4,990,731 A | * | 2/1991 | Wu | ......................... H01H 13/50 200/345 |
| 5,442,152 A | * | 8/1995 | Huang | .................. H01H 13/705 200/341 |

* cited by examiner

*Primary Examiner* — Edwin A. Leon
*Assistant Examiner* — Iman Malakooti
(74) *Attorney, Agent, or Firm* — Kirton & McConkie; Evan R. Witt

(57) ABSTRACT

A key structure includes a support shaft, a resilience sheet, a pedestal and a keycap. While the keycap is pressed down in response to an external force, the support shaft is moved downwardly and the resilience sheet is correspondingly moved. Since a resilience part of the resilience sheet is pushed by a push part of the pedestal, the resilience part is subjected to deformation. After the resilience part is moved across the push part, the resilience part is elastically restored and swung. Consequently, the resilience part collides with the inner surface of the sliding groove to generate a click sound.

11 Claims, 4 Drawing Sheets

KEY STRUCTURE

FIELD OF THE INVENTION

The present invention relates to the field of an input device, and more particularly to a key structure.

BACKGROUND OF THE INVENTION

In modern societies, electronic products become indispensable parts in human lives. The electronic products are applied in many sectors, including food, clothing, housing, transportation, education and entertainment. Generally, the electronic product is equipped with a key structure. Since the mechanical key provides good tactile feel and click sound, the mechanical key is favored by consumers. However, the conventional mechanical key has so many components. Since the structure of the mechanical key is complicated, it is difficult to assembly the mechanical key. Moreover, a spring structure is usually installed in a middle region of the conventional mechanical key. In case that the mechanical key is a luminous key, the backlight beam passing through the key structure is usually hindered by the spring structure. Under this circumstance, the luminous efficacy of the mechanical key is deteriorated.

For solving the above drawbacks, there is a need of providing a simplified and easily-assembled key structure while achieving the tactile feel and click sound similar to a mechanical key.

SUMMARY OF THE INVENTION

The present invention provides a simplified and easily-assembled key structure while achieving the tactile feel and click sound similar to a mechanical key.

In accordance with an aspect of the present invention, there is provided a key structure. The key structure includes a support shaft, a resilience sheet, a pedestal and a keycap. The support shaft includes an accommodation space and a hollow part. The hollow part is in communication with the accommodation space. The resilience sheet is disposed within the accommodation space. The resilience sheet includes a resilience part. A portion of the resilience part is penetrated through the hollow part. The pedestal includes a sliding groove and a push part. The support shaft is movable within the sliding groove. The push part is disposed on an inner surface of the sliding groove. The push part is aligned with the resilience part. The keycap is combined with the support shaft. When an external force is applied to the keycap, the resilience part is pushed by the push part and subjected to deformation. After the resilience part is moved across the push part, the resilience part is elastically restored and swung, so that the resilience part collides with the inner surface of the sliding groove to generate a click sound.

In an embodiment, the key structure further includes a switch module, and the switch module is installed on a bottom side of the pedestal. The switch module includes a membrane circuit board and an elastic element. The elastic element is disposed on the membrane circuit board. The elastic element is accommodated within the sliding groove.

Preferably, while the keycap is pressed down in response to the external force, the elastic element is pressed by the support shaft, and the switch module is triggered to generate a corresponding key signal.

Preferably, when the external force is eliminated, the elastic element is elastically restored to provide an elastic restoring force to the support shaft. While the support shaft is returned in response to the elastic restoring force, the resilience part is moved across the push part to collide with the push part, so that another click sound is generated.

In an embodiment, the hollow part includes a first opening and a second opening.

In an embodiment, the resilience sheet includes a first resilience arm and a second resilience arm. The first resilience arm is penetrated through the first opening. The second resilience arm is penetrated through the second opening.

In an embodiment, the push part includes a first push block and a second push block. The first push block has a first slant surface. The second push block has a second slant surface.

While keycap is pressed down in response to the external force, the first resilience arm and the second resilience arm are contacted with and moved along the first slant surface of the first push block and the second slant surface of the second push block, respectively. Consequently, the first resilience arm and the second resilience arm are subjected to elastic deformation.

In an embodiment, the resilience sheet further includes a fixing part, and the fixing part is connected with the first resilience arm and the second resilience arm. The fixing part is fixed in the accommodation space, so that the resilience sheet is installed in the accommodation space.

In an embodiment, bulge is formed on an outer surface of the support shaft, and a stopping part corresponding to the bulge is formed on the inner surface of the sliding groove. When the bulge is contacted with the stopping part, the support shaft is stopped from being moved downwardly.

In an embodiment, the bulge is located above the hollow part.

In an embodiment, the stopping part is located below the push part.

In an embodiment, the keycap includes a first coupling structure, and the support shaft includes a second coupling structure. The first coupling structure and the second coupling structure are engaged with each other, so that the keycap is detachably coupled with the support shaft.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
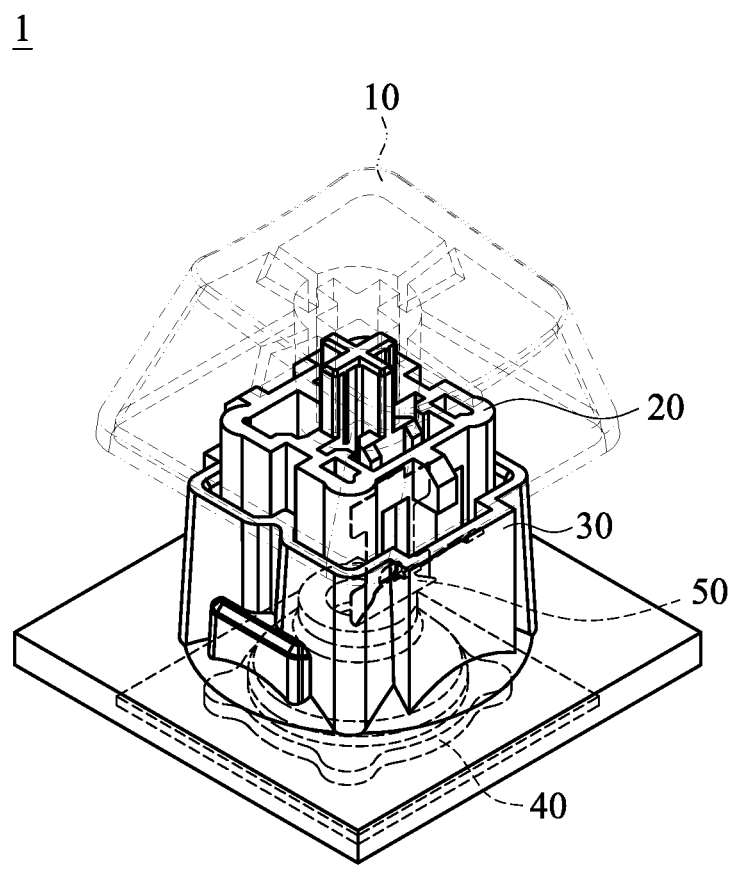
FIG. 1 is a schematic perspective view illustrating a key structure according to an embodiment of the present invention.

Please refer to FIG. 1. FIG. 1 is a schematic perspective view illustrating a key structure according to an embodiment of the present invention. As shown in FIG. 1, the key structure 1 comprises a keycap 10, a support shaft 20, a pedestal 30 and a switch module 40.

Figure 2A:
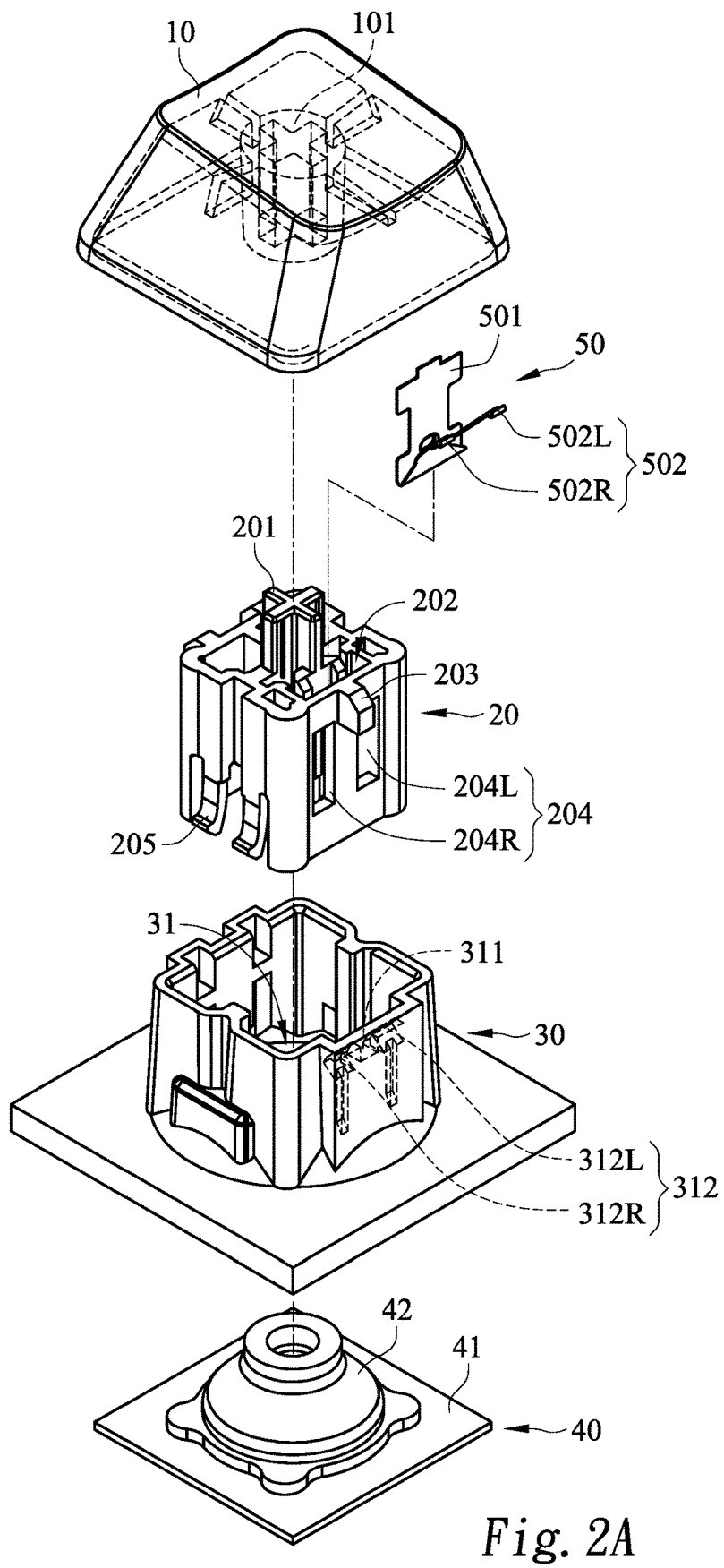
FIG. 2A is a schematic exploded view illustrating the key structure according to the embodiment of the present invention and taken along a viewpoint.
Figure 2B:
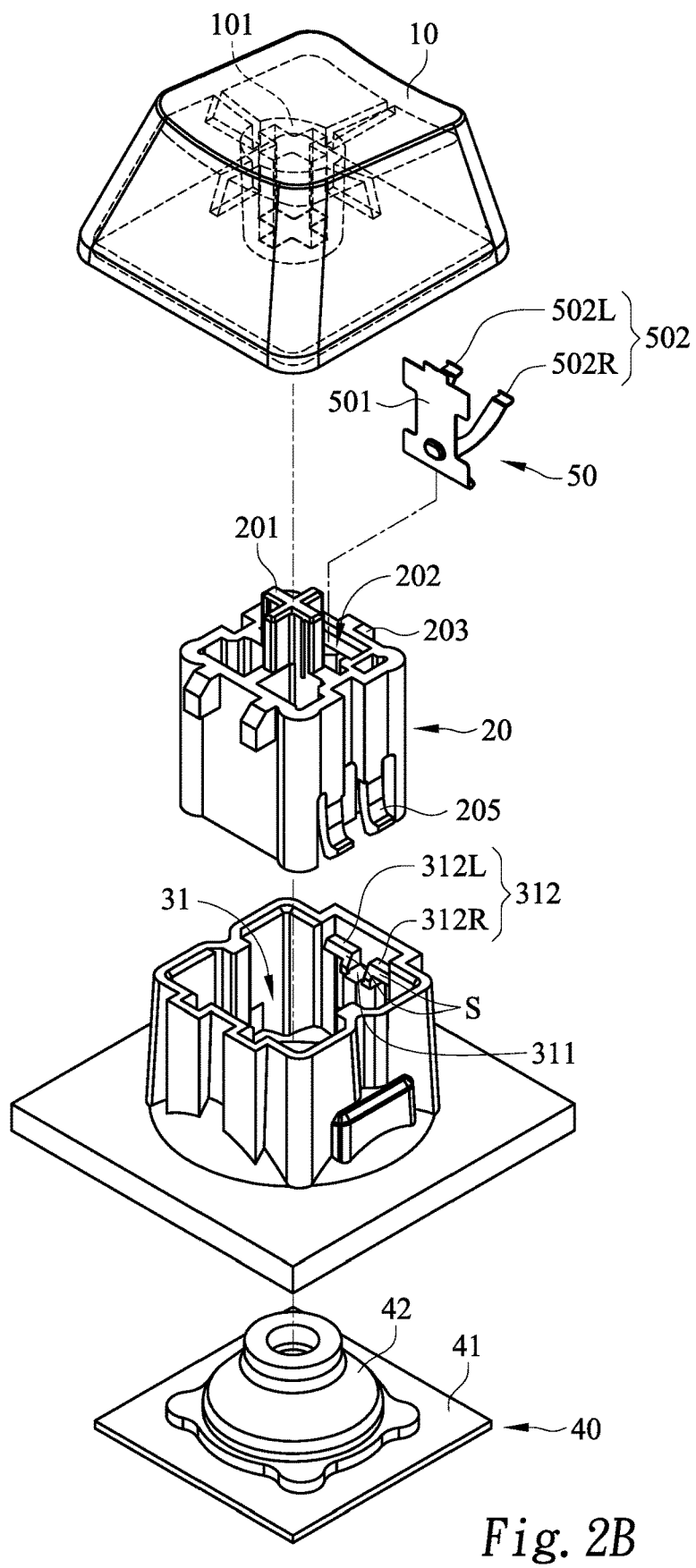
FIG. 2B is a schematic exploded view illustrating the key structure according to the embodiment of the present invention and taken along another viewpoint.

Please refer to FIGS. 2A and 2B. FIG. 2A is a schematic exploded view illustrating the key structure according to the embodiment of the present invention and taken along a viewpoint. FIG. 2B is a schematic exploded view illustrating the key structure according to the embodiment of the present invention and taken along another viewpoint. The keycap 10 of the key structure 1 comprises a first coupling structure 101. The first coupling structure 101 is disposed on a bottom surface of the keycap 10. The support shaft 20 comprises a second coupling structure 201, an accommodation space 202, a bulge 203, a hollow part 204 and a rib part 205. The second coupling structure 201 is located at a top side of the support shaft 20. The second coupling structure 201 is engaged with the first coupling structure 101 of the keycap 10. Consequently, the keycap 10 is detachably coupled with the support shaft 20. In such way, the keycap may be replaced with another keycap having a different color, shape or material. In an embodiment, the first coupling structure 101 is a crisscross-shaped recess, and the second coupling structure 201 is a crisscross-shaped rod.

The accommodation space 202 is disposed within the support shaft 20. The hollow part 204 is in communication with the accommodation space 202. In an embodiment, the hollow part 204 comprises a first opening 204L and a second opening 204R. The bulge 203 is disposed on an outer surface of the support shaft 20 and located above the hollow part 204.

Moreover, a resilience sheet 50 is disposed within the accommodation space 202. The resilience sheet 50 comprises a fixing part 501 and a resilience part 502. The resilience part 502 is connected with the fixing part 501. In an embodiment, the fixing part 501 is locked in the accommodation space 202. Consequently, the resilience sheet 50 is fixed in the accommodation space 202. The resilience part 502 comprises a first resilience arm 502L and a second resilience arm 502R, which are connected with the fixing part 501. When the resilience sheet 50 is fixed in the accommodation space 202, the first resilience arm 502L is partly penetrated through the first opening 204L and the second resilience arm 502R is partly penetrated through the second opening 204R.

In this embodiment, the resilience part 502 comprises two resilience arms. It is noted that the number of the resilience arms of the resilience part may be varied in the production process of the key structure according to the practical requirements about the tactile feel of the key structure. For example, the arrangement of a single resilience arm provides a lightly-pressed tactile feel. In addition, more than two resilience arms provide the heavily-depressed tactile feel. That is, the arrangement of the resilience arms is not restricted. Moreover, in case that the material of the resilience sheet 50 is changed, the elastic restoring force of the resilience sheet 50 is adjusted. Consequently, the tactile feel of pressing the key structure is adjusted.

Please refer to FIG. 2A again. The pedestal 30 comprises a sliding groove 31. The support shaft 20 is accommodated within the sliding groove 31. The rib part 205 of the support shaft 20 is engaged with an inner surface of the sliding groove 31. Consequently, the support shaft 20 is movable upwardly or downwardly within the sliding groove 31. Moreover, a stopping part 311 corresponding to the bulge 203 and a push part 312 corresponding to the resilience part 502 are formed on the inner surface of the sliding groove 31. In this embodiment, the stopping part 311 is located below the push part 312. The push part 312 comprises a first push block 312L corresponding to the first resilience arm 502L and a second push block 312R corresponding to the second resilience arm 502R. For assembling the key structure 1, the resilience sheet 50 and the support shaft 20 are firstly combined as a semi-finished product, and then the semi-finished product and the pedestal 30 are combined together. Consequently, the process of assembling the key structure 1 is simplified.

In some situations, the key structure 1 has to be inverted. For example, during the process of installing the switch module 40, the key structure 1 has to be inverted. In this embodiment, the support shaft 20 is engaged with the sliding groove 31 through the rib part 205. Consequently, while the key structure 1 is inverted, the support shaft 20 is not detached from the pedestal 30. Consequently, the efficiency of assembling the key structure 1 is enhanced.

Please refer to FIG. 2B. Each of the first push block 312L and the second push block 312R of the push part 312 has a slant surface S. While the support shaft 20 is moved downwardly and the resilience sheet 50 is correspondingly moved, the resilience part 502 is pushed by the push part 312. Consequently, the first resilience arm 502L and the second resilience arm 502R are contacted with the slant surface S of the first push block 312L and the slant surface S of the second push block 312R, respectively. As the first resilience arm 502L and the second resilience arm 502R are moved along the slant surface S of the first push block 312L and the slant surface S of the second push block 312R, the resilience part 502 is compressed and subjected to elastic deformation.

The switch module 40 is located under the pedestal 30. The switch module 40 comprises a membrane circuit board 41 and an elastic element 42. The elastic element 42 is disposed on the membrane circuit board 41. The keycap 10 is arranged beside a first end of the sliding groove 31. The elastic element 42 is located at a second end of the sliding groove 31. The first end and the second end of the sliding groove 31 are opposed to each other. In an embodiment, the elastic element 42 is a dome-shaped silicone rubbery elastomer. While the keycap 10 is pressed down in response to an external force, the support shaft 20 is moved downwardly to press the elastic element 42. The elastic element 42 is subjected to elastic deformation to trigger a switch element (not shown) on the membrane circuit board 41. Consequently, the switch module 40 generates a corresponding key signal. When the external force is eliminated, the elastic element 42 is elastically restored and the elastic element 42 provides an elastic restoring force to the support shaft 20. In response to the elastic restoring force of the elastic element 42, the support shaft 20 is returned to its original position.

Figure 3:
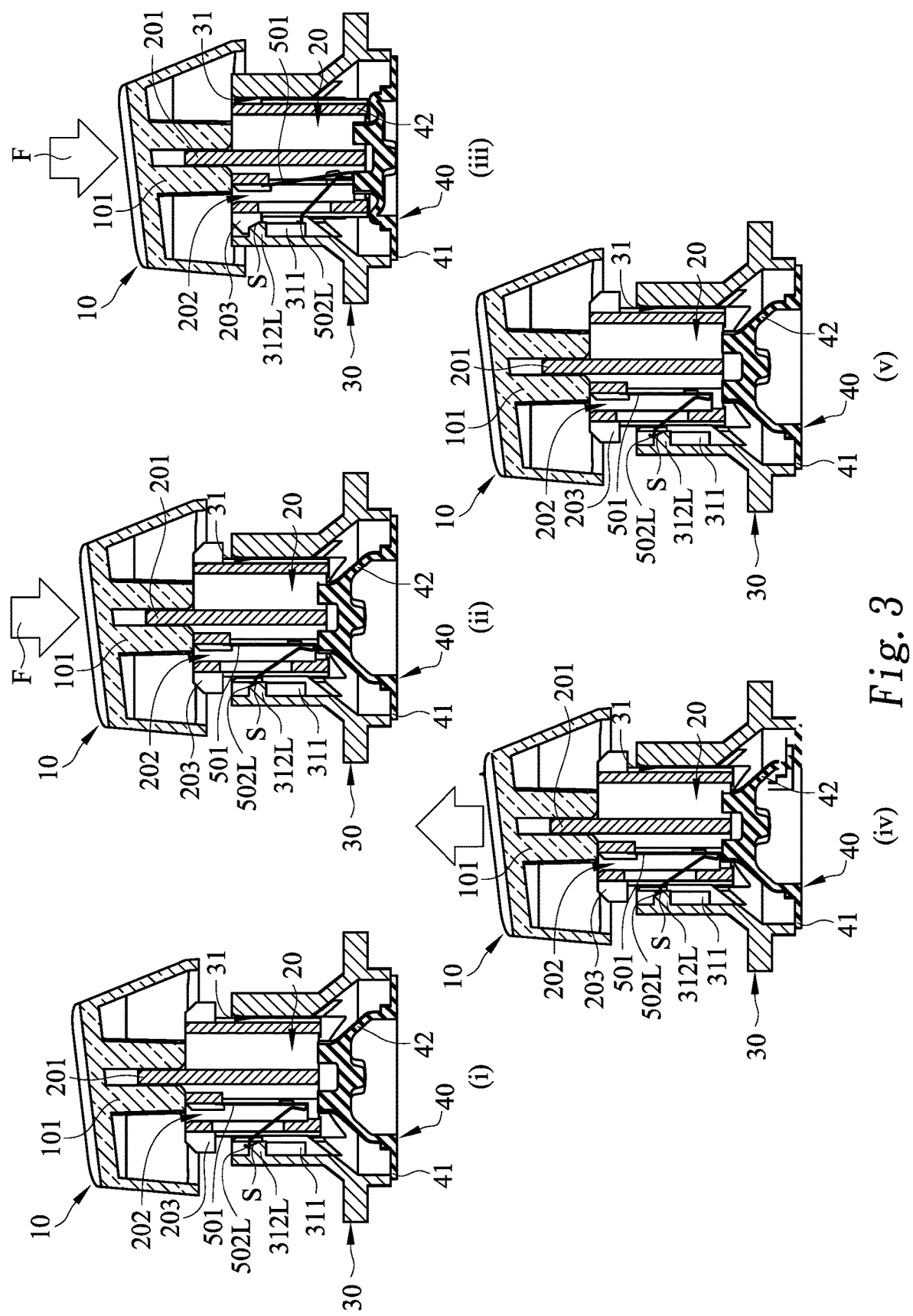
FIG. 3 schematically illustrates the actions of the key structure according to the embodiment of the present invention.

Please refer to FIG. 3. FIG. 3 schematically illustrates the actions of the key structure according to the embodiment of the present invention.

In FIG. 3(i), the keycap 10 is in an initial position. Meanwhile, the first resilience arm 502L of the resilience part 502 is contacted with the first push block 312L, and the support shaft 20 is supported by and contacted with the elastic element 42. Since the dome-shaped elastic element 42 and the resilience part 502 provide a sufficient upward supporting force, the support shaft 20 is uniformly and stably supported.

Please refer to FIG. 3(*ii*). An external forever F is applied to the keycap 10, and thus the support shaft 20 is moved downwardly. While the support shaft 20 is moved downwardly and the resilience sheet 50 is correspondingly moved, the first resilience arm 502L of the resilience part 502 is pushed by the first push block 312L of the push part 312. Consequently, the first resilience arm 502L is contacted with the slant surface S of the first push block 312L and moved along the slant surface S. Meanwhile, the first resilience arm 502L is compressed and subjected to elastic deformation. Consequently, the stepper feel of pressing the key structure is generated.

Please refer to FIG. 3(*iii*). Then, the bulge 203 is contacted with the stopping part 311. Consequently, the support shaft 20 is no longer moved downwardly. Meanwhile, the first resilience arm 502L of the resilience part 502 is moved across the first push block 312L of the push part 312 and elastically restored. Due to the elastic restoration, the first resilience arm 502L of the resilience part 502 is swung to collide with the inner surface of the sliding groove 31. Consequently, a first click sound is generated. Moreover, since the elastic element 42 is subjected to elastic deformation to trigger the switch element (not shown) on the membrane circuit board 41, the switch module 40 generates the corresponding key signal.

The external force F is no longer applied to the keycap 10. Meanwhile, the elastic element 42 is elastically restored, and the elastic element 42 provides a sufficient elastic restoring force to the support shaft 20. In response to the elastic restoring force of the elastic element 42, the support shaft 20 is returned. Then, please refer to FIG. 3(*iv*). While the support shaft 20 is returned, the first resilience arm 502L of the resilience part 502 is moved across the first push block 312L of the push part 312. Since the first resilience arm 502L of the resilience part 502 collides with the first push block 312L of the push part 312, a second click sound is generated.

Please refer to FIG. 3(*v*). Afterwards, the keycap 10 is returned to its original position.

The actions of the second resilience arm 502R of the resilience part 502 are similar to those of the first resilience arm 502L, and are not redundantly described herein.

From the above descriptions, the present invention provides the key structure. When compared with the conventional technologies, the key structure of the present invention has less number of components and simplified construction. Consequently, the key structure of the present invention can be easily assembled. Moreover, in comparison with the spring structure of the mechanical key, the elastic element of the present invention is a dome-shaped silicone rubbery elastomer for supporting the support shaft. Since the backlight beam passing through the key structure is not hindered by the spring structure, the luminous efficacy of the key structure is more uniform. Moreover, while the key structure is pressed down, the resilience sheet in the support shaft and the inner surface of the pedestal collide with each other to generate the stepped feel and the click sound similar to the conventional mechanical key. In other words, the key structure of the present invention is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A key structure, comprising:
a support shaft comprising an accommodation space and a hollow part, wherein the hollow part is in communication with the accommodation space, wherein the hollow part comprises a first opening and a second opening;
a resilience sheet disposed within the accommodation space, wherein the resilience sheet comprises a resilience part, and a portion of the resilience part is penetrated through the hollow part, wherein the resilience sheet comprises a first resilience arm and a second resilience arm, wherein the resilience arm is penetrated through the first opening, and the second resilience arm is penetrated through the second opening;
a pedestal comprising a sliding groove and a push part, wherein the support shaft is movable within the sliding groove, the push part is disposed on an inner surface of the sliding groove, and the push part is aligned with the resilience part; and
a keycap combined with the support shaft,
wherein when an external force is applied to the keycap, the resilience part is pushed by the push part and subjected to deformation, wherein after the resilience part is moved across the push part, the resilience part is elastically restored and swung, so that the resilience part collides with the inner surface of the sliding groove to generate a click sound.

2. The key structure according to claim 1, wherein the key structure further comprises a switch module, and the switch module is installed on a bottom side of the pedestal, wherein the switch module comprises a membrane circuit board and an elastic element, wherein the elastic element is disposed on the membrane circuit board, and the elastic element is accommodated within the sliding groove.

3. The key structure according to claim 2, wherein while the keycap is pressed down in response to the external force, the elastic element is pressed by the support shaft, and the switch module is triggered to generate a corresponding key signal.

4. The key structure according to claim 2, wherein when the external force is eliminated, the elastic element is elastically restored to provide an elastic restoring force to the support shaft, wherein while the support shaft is returned in response to the elastic restoring force, the resilience part is moved across the push part to collide with the push part, so that another click sound is generated.

5. The key structure according to claim 1, wherein the push part comprises a first push block and a second push block, wherein the first push block has a first slant surface, and the second push block has a second slant surface.

6. The key structure according to claim 5, wherein while keycap is pressed down in response to the external force, the first resilience arm and the second resilience arm are contacted with and moved along the first slant surface of the first push block and the second slant surface of the second push block, respectively, so that the first resilience arm and the second resilience arm are subjected to elastic deformation.

7. The key structure according to claim 1, wherein the resilience sheet further comprises a fixing part, and the fixing part is connected with the first resilience arm and the second resilience arm, wherein the fixing part is fixed in the accommodation space, so that the resilience sheet is installed in the accommodation space.

8. The key structure according to claim 1, wherein a bulge is formed on an outer surface of the support shaft, and a stopping part corresponding to the bulge is formed on the inner surface of the sliding groove, wherein when the bulge is contacted with the stopping part, the support shaft is stopped from being moved downwardly.

9. The key structure according to claim 8, wherein the bulge is located above the hollow part.

10. The key structure according to claim 8, wherein the stopping part is located below the push part.

11. The key structure according to claim 1, wherein the keycap comprises a first coupling structure, and the support shaft comprises a second coupling structure, wherein the first coupling structure and the second coupling structure are engaged with each other, so that the keycap is detachably coupled with the support shaft.

\* \* \* \* \*